Jan. 14, 1964  D. M. WILLYOUNG  3,118,015
BALANCED TRANSPOSITION FOR STRANDED CONDUCTOR
WITH ASYMMETRICALLY DISPOSED STRAND ENDS
Filed Oct. 26, 1962  2 Sheets-Sheet 2
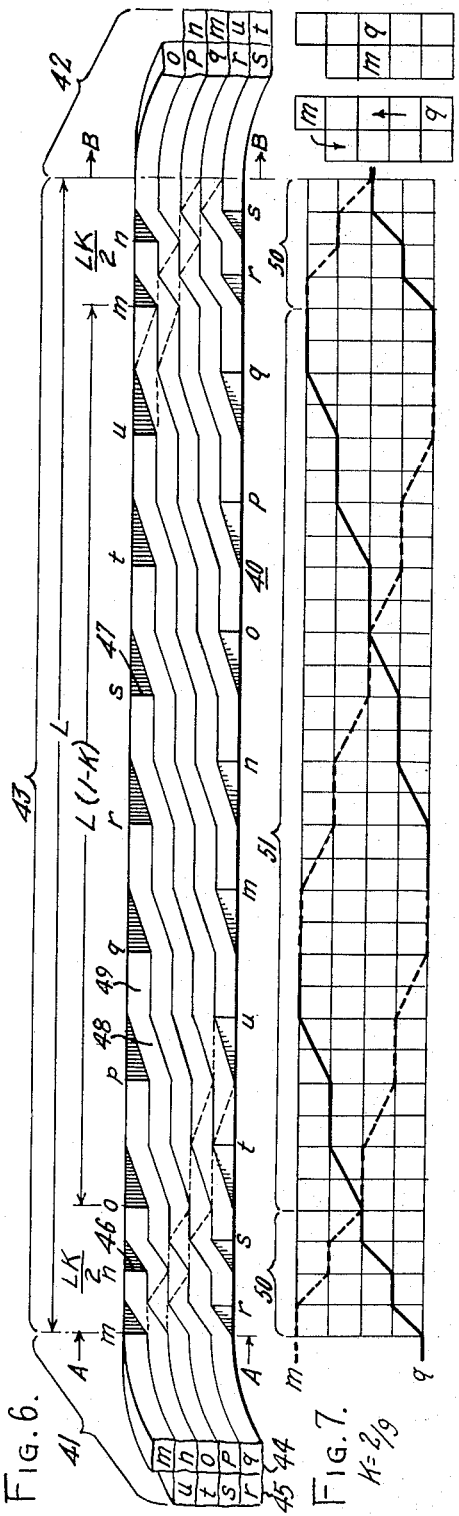
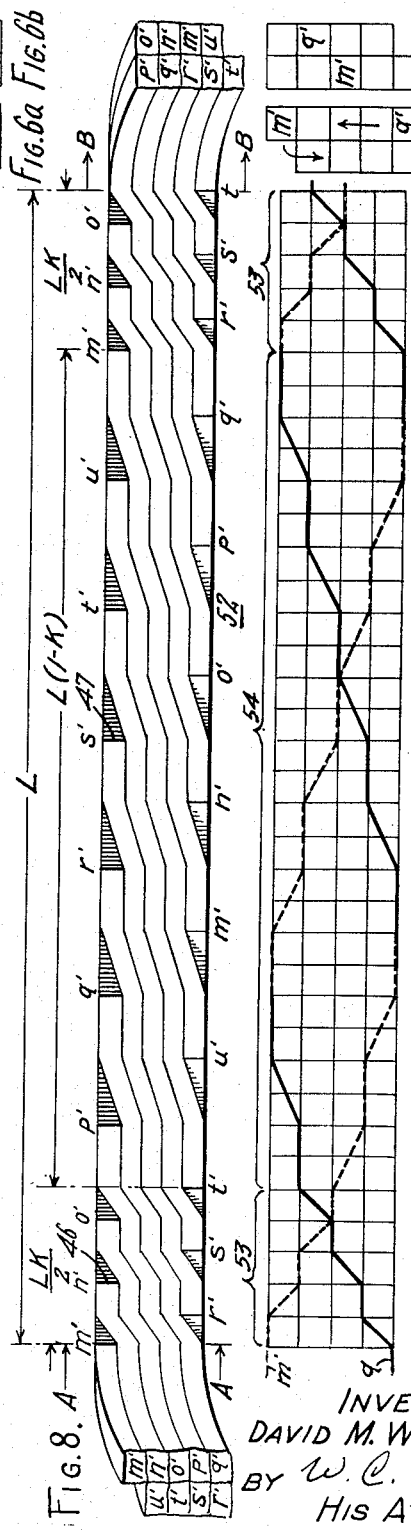
INVENTOR
DAVID M. WILLYOUNG
BY W. C. Crutcher
HIS ATTORNEY

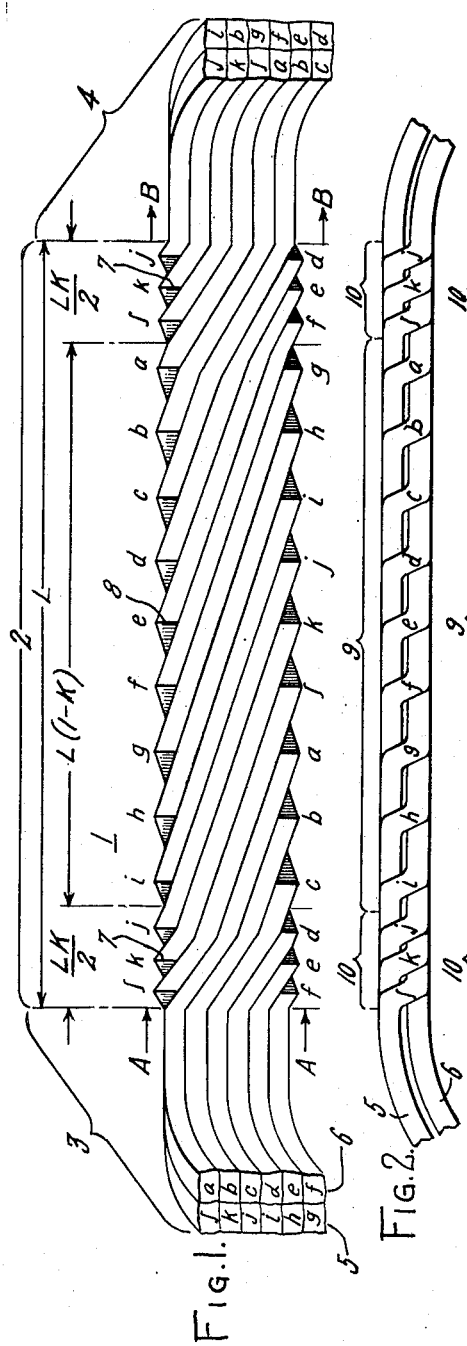
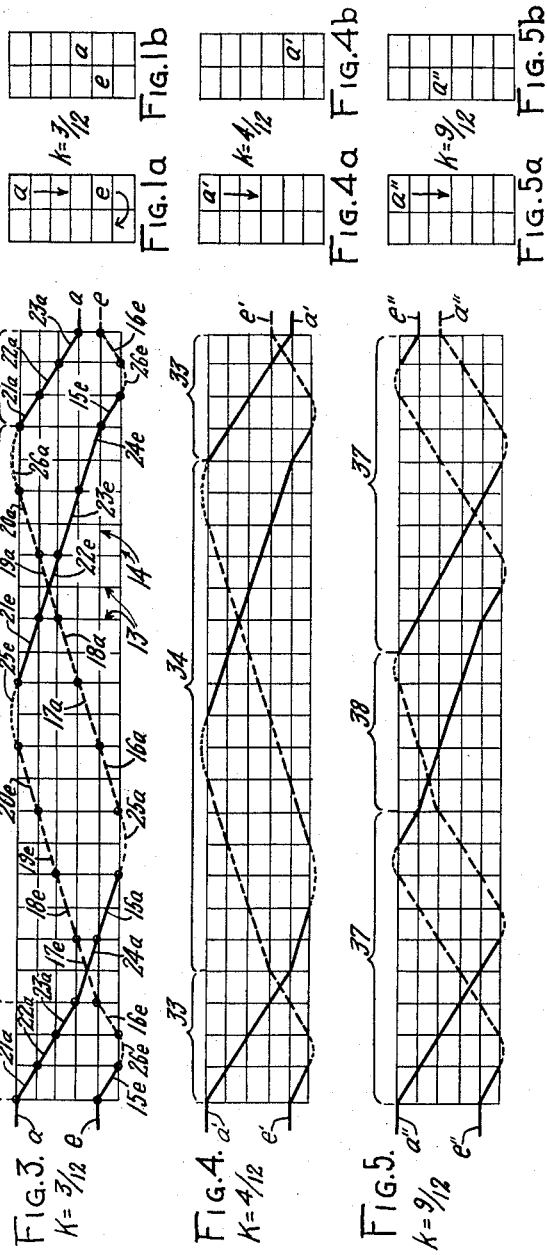

United States Patent Office 3,118,015
Patented Jan. 14, 1964

3,118,015
BALANCED TRANSPOSITION FOR STRANDED CONDUCTOR WITH ASYMMETRICALLY DISPOSED STRAND ENDS
David M. Willyoung, Scotia, N.Y., assignor to General Electric Company, a corporation of New York
Filed Oct. 26, 1962, Ser. No. 233,334
7 Claims. (Cl. 174—33)

This invention relates to a transposition arrangement for multi-strand conductors for use in electrical machinery. More particularly, it relates to an improved multi-strand conductor for placement in the slots of a magnetic structure, such as the armature slots of a large A.C. generator, which has the strands transposed to balance voltages induced between strands over the length of the slot, while causing any given strand to take a relative position leaving the slot which is asymmetrical with respect to the position of the same strand entering the slot.

Many types of electrical equipment, such as large A.C. generators, have multi-strand conductors disposed in slots formed in a laminated core of magnetic material. These conductors are connected outside the magnetic core in various ways to suit a particular application. When alternating currents flow through the conductors, alternating magnetic leakage fluxes are produced, which cross the slot and induce voltage components between the conductor strands at each differential element of conductor length. When the sum of these voltage components between any particular pair of strands over their length is appreciable, sizable circulating currents will flow between the strands in the closed loop formed by connecting the strands together at each end. These circulating currents are of no useful value and produce additional losses in the form of heat.

Previously known transposition arrangements have been used to balance the voltages induced between strands over the length of the slot. These arrangements have been restricted to forms in which the strands are in symmetrically disposed positions at opposite ends of the slot. By symmetrically disposed, it is meant that the strands are in the same positions relative to the other strands in the conductor at the two cross-sections at opposite ends of the slot, although in certain arrangements the two cross-sections are in inverted positions (rotated 180°) at opposite ends. Because the strands shift positions repetitively in a closed path, transpositions have sometimes been described by specifying the degrees of "rotation" of a particular strand along the conductor, as though it moved in a circle, although it actually shifts relative positions in a rectilinear manner. For example, a transposition in which each strand shifts step-wise through all of the relative positions in the conductor cross-section, so that it reaches its starting position at the opposite end of the slot, has been described as a 360° slot transposition. Previously known balanced transpositions have been symmetrical, i.e., restricted to transpositions in which the position of a strand leaving the slot is either the same as it was when it entered the slot, or else in the exactly opposite position. In all these previous arrangements, there has been no shift in the position of the strands relative to each other at opposite ends of the slot.

Various methods for shifting or "rotating" the strands in a cyclical manner to successive positions within the slot have been suggested. A commonly used method is the transposition depicted in U.S. Patent 1,144,252 issued on June 22, 1915 to Ludwig Roebel, which uses two columns of an equal number of strands each. Another method is shown in U.S. Patent 2,249,509 issued on July 15, 1941 to A. U. Welch, Jr. et al., which uses an odd number of strands (one column has one more strand than the other) to provide a bar with an essentially rectangular uniform cross-section, without protruding transposition crossovers.

The aforementioned restriction on previous balanced transpositions to those having identical or inverted cross sections (i.e., symmetrically disposed strands) at opposite ends of the slot reduces the flexibility available to the designer in the arrangement and electrical connections of the portions of the conductors outside the slot, known as the "end turns." For example, in A.C. generators, various types of strand connections or strand arrangements are employed to reduce leakage flux losses in the end turns. One such method is described in U.S. Patent 1,499,695, issued to R. Rudenberg on July 1, 1924. In that patent, insulated strand groups are carried through the conductors in several slots making up a "phase belt" of the generator. These strand groups are rotated in position in successive slots so that, over the phase belt, each group occupies each possible strand group position, thereby reducing circulating currents between groups. The strands making up a group are generally connected together at the end of each half-turn, however, so that circulating currents between strands in the group are not reduced (although they may be tolerable because the group height and hence the reduced voltage, is small). Since the connections in the end turns must be made between strand groups at different relative positions in the bars, it has previously been necessary to use exterior connecting straps or to transpose strand groups at the bar end connections, so as to have the strand groups shift relative positions slightly from one end of the slot to the other. These somewhat complicated end connections, together with the losses due to circulating currents between strands in a group, will be avoided with a balanced slot transposition with asymmetrical ends arranged to shift the strands exactly one group position.

Another common method employed in generators has been to connect all the strands of each armature bar together in parallel at each end connection. With this method of connection, end turn losses may be reduced by causing the relative strand positions to be exactly reversed at opposite ends of the slot. One example of such a construction is shown in U.S. Patent 2,821,641, issued to W. L. Ringland on January 28, 1958. A symmetrical transposition such as Ringland's, however, may not suit unsymmetrical flux distributions existing at opposite ends of the generator. For example, the cone angles of the end turns may be different, the axial length of end turns may be different, and practical design considerations may offer improved operations when the strands are asymmetrically disposed at opposite ends of the slot. Also, the Ringland transposition requires that at least one-half of the armature bar utilize "short pitch" or closely spaced transposition crossovers which may tend to increase the possibility of "strand shorts" (contact of two or more strands through the relatively thin strand insulation) due to movement of the bar from thermal expansion and contraction in the slots.

Therefore, it is desirable to have a multi-strand conductor in which the voltage induced by strong cross-slot flux is balanced between strands, and in which any desired relative strand shift at opposite ends of the slot can be obtained. Such a conductor should not be restricted to relative strand shifts which are symmetrical, and should be applicable to either an even or odd number of strands.

Accordingly, one object of the present invention is to provide a multi-strand conductor transposition which balances voltages induced between strands along the slot for any desired relative shift of strand positions between the ends of the slot.

Another object of the invention is to provide a balanced armature bar transposition in which the strands are asymmetrically disposed at opposite ends of the slot.

Another object is to provide an improved armature bar having either an odd or even number of strands, which is balanced against unequal voltages induced in the slot, regardless of the positions taken by the strands at the ends of the slot.

Briefly stated, the invention is practiced by transposing the strands at different rates along sections of the slot portion of an armature bar, and selecting the respective lengths of the twisted strand sections according to a formula which determines these lengths. By so doing, a given portion of any strand will occupy the same radial position as an equivalent portion of any other strand for the same increment of slot length, while the positions taken by any given strand at opposite ends of the slot portion will be asymmetrically disposed from one another.

The subject matter regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic elevation view of a portion of a multi-strand armature bar, having an even number of strands, with the heavy insulating sheath omitted for clarity;

FIGS. 1a and 1b are cross-section views taken through the armature bar of FIG. 1 along sections A—A and B—B respectively, looking in the direction of the arrows;

FIG. 2 is a plan view of the armature bar of FIG. 1;

FIG. 3 is a simplified representation of the paths taken by two typical strands of an armature bar as in FIG. 1;

FIGS. 4 and 5 are simplified views similar to FIG. 3, for strand shifts other than the one depicted in FIGS. 1 to 3;

FIGS. 4a and 4b are bar cross-sections at entrance to and exit from the slot, similar to 1a and 1b, but corresponding to the strand shift of FIG. 4;

FIGS. 5a and 5b are bar cross-sections similar to 1a and 1b, but corresponding to the strand shift of FIG. 5;

FIG. 6 is a schematic elevation view of a bar having an odd number of strands;

FIGS. 6a and 6b are cross-sectional views taken through the armature bar of FIG. 6 along sections A—A and B—B, looking in the direction of the arrows;

FIG. 7 is a simplified representation of FIG. 6 showing paths taken by two typical strands;

FIG. 8 is a schematic elevation view of a bar having an odd number of strands, similar to FIG. 6;

FIGS. 8a and 8b are cross-sectional views through the armature bar of FIG. 8 along sections A—A and B—B, and FIG. 9 is a simplified representation of FIG. 8, showing two typical strands.

Referring to FIG. 1 of the drawing, there is seen a schematic elevation view of portions of an armature bar, indicated generally as 1. The armature bar comprises a straight section 2 of twisted strands adapted to fit in the slot of a dynamoelectric machine (not shown) and also includes opposite end-turn portions 3, 4, only portions of which are shown, which curve both circumferentially and radially from the straight slot portion 2, along a complex arcuate curve to connect with similar armature bars (not shown). The armature bar 1 is made up of two stacks 5, 6 of strands, each stack containing six strands. Normally, an armature bar would contain many more strands than shown and would be much longer in relation to its height than the one shown. However, the illustrated armature bar 1 will serve to illustrate the concept of the invention, which is likewise applicable to bars of a larger number of strands.

Also, although the strands are shown as solid, it will be understood that they may be hollow or provided with suitable ventilating ducts for circulating liquid or gaseous coolant therethrough to "direct-cool" the strands. It will also be understood that the strands are lightly insulated from one another and surrounded by a heavy sheath of ground insulation (not shown), these details being omitted in order not to obscure the principle of the invention here.

The strands are designated with lower case letters $a$ through $l$ inclusive. Transposition is accomplished by repetitively bending the strands from the top of one stack into the other stack while the strands from the second stack are bent from the bottom thereof back into the first stack. The crossovers of the strands from one stack to the next stack are either designated as "short pitch crossovers" 7, or "long pitch crossovers" 8. Short pitch crossovers 7 are uniformly spaced along the bar but are half as far apart as are the long pitch crossovers 8. The crossovers are designated with the lower case letter designation of the strand making the change from one stack to the other, both at the top and bottom of the bar.

Reference to the plan view of FIG. 2 further illustrates the manner in which the crossovers are made, wherein the strands are designated by lower case letters where they cross into the adjacent stack.

In accordance with the invention, the slot portion 2 of the bar is divided into a central twisted strand section designated by bracket 9 (FIG. 2) and employing long pitch crossovers 8 (FIG. 1). The opposite end sections of the slot portion 2 are designated by brackets 10. End sections 10 employ short pitch crossovers 7 and in the embodiment shown in FIGS. 1 and 2, are each of a length of ⅛ the total length of the slot portion 2.

The respective lengths of the central section 9 and the end sections 10 are determined in accordance with a new method, by which the correct lengths can be computed for any desired relative shift of strands from one end of the slot portion 2 to the other.

In order to describe the net relative shift of strands from one end of the slot portion to the other, it will be necessary to introduce new terms. The first is "strand shift" designated as "S" and is determined by examining cross sections taken through the bar at opposite ends of slot portion 2. The net shift or change in relative position of any given strand is determined by counting strands from the original position to the final position of the strand, in the direction in which the shift takes place. FIGS. 1a and 1b illustrate this procedure for the bar of FIG. 1. It can be seen that strand $a$ has a net shift of 3 spaces between sections A—A and B—B of FIG. 1. Therefore, strand shift S equals 3.

Another concept is "strand shift ratio" designated "K," which relates the strand shift S to the total number of strands "n" in the bar. The strand shift ratio is the number of relative strand positions shifted divided by the total number of conductor strands. Hence, the strand shift ratio K is equal to S divided by $n$. From this definition, it can be seen that a strand shift ratio of 0, or any integer such as 1, is comparable to a 360° transposition since the strand occupies its original position after passing through the slot. A strand shift ratio of 0.5 means that the strand occupies a reversed or diametrically opposite position from that at which it entered the slot. According to the foregoing definitions, strand shift ratios of 0, 0.5 or 1 represent the results of symmetrical transpositions known in the prior art.

However, the present invention makes possible asymmetric transpositions having strand ratios other than 0, 0.5 or 1. It will be appreciated from the foregoing definitions that the ability to select any strand shift ratio between 0 and 1 is tantamount to selecting any desired relative shift of the strands from one end of the slot portion to the other.

Referring to FIGS. 1a and 1b again, where there are 12 strands in the bar, it is seen that the strand shift ratio there is $S/n$ or 3/12 or 0.25. Once a desired strand shift ratio is selected, the lengths of the slot sections can be determined by the following formulas. In FIG. 1 of the drawing, the length of the central portion 9 consisting of long pitch crossovers 8 is equal to $$L(1-K)$$

where L is the total length of the slot section 2, and where K is the strand shift ratio as defined above.

Similarly, the length of each of the end sections 10 employing short pitch crossovers 7 is equal to $$\frac{LK}{2}$$

where L and K are as defined above.

The armature bar of FIGS. 1 and 2 is illustrated for a strand shift ratio of 3/12 or 0.25, although as will be described, any strand shift ratio between 0 and 1 is obtainable by the present invention. It will be understood that since the present invention relates to asymmetrically disposed strand ends, the strand shift ratios desired lie between 0 and 1, excluding 0, 0.5 and 1 which would be symmetrical and which could be accomplished by prior art arrangements.

In FIG. 3, the vertical grid lines 13 represent increments of bar length, while the horizontal grid lines 14 define radial slot positions between them. Therefore, each radial slot position over an increment of bar length is represented by a rectangle. If each segment of one strand lying in such a rectangle finds its counterpart in a segment or segments of another strand lying in one or more rectangles at the same radial height, the induced voltage due to cross-slot flux will be balanced.

Examining strands $a$ and $e$ in FIG. 3, which may be taken as typical, the strands have been divided into segments. Segments $15e$ of strand $e$ are equivalent to segment $15a$ of strand $a$ since they have the same total length along the bar and are at the same height. Similarly, segments $16e$ are equivalent to segment $16a$; segment $17e$ is equivalent to segment $17a$, and so forth through segments $24e$ and $24a$. The crossovers project somewhat and are indicated by dotted curves. Crossover $25e$ balances crossover $25a$, and crossovers $26e$ are the same length as and hence balance crossover $26a$.

It will be observed in FIG. 3 that in the end sections 10, the "slope" of the strands $a$, $e$, i.e., vertical travel per increment of horizontal travel, is twice as great as the slope of the same strands in the center portion 9. However, when the horizontal distances traveled by the strands in any radial (vertical) slot position are taken into account, the bar will nevertheless be balanced against cross-slot flux if the lengths of the bar portions are computed according to the aforementioned formula.

Referring to FIGS. 4, 4a. 4b of the drawing, a bar having a strand shift ratio of 4/12 or 0.33 is illustrated. FIG. 4 shows two typical strands $a'$, $e'$, undergoing transposition along the slot portion of the bar. The length of each end section 33, and the length of the center section 34, are $L/6$ and $2L/3$ respectively, calculated as above. Here, every strand shifts four places, as can be seen from a comparison of FIG. 4a and Fig. 4b.

In FIG. 5, two typical strands $a''$, $e''$ are shown in a bar which has a strand shift ratio of 9/12 or 0.75. The end sections 37 are each of a length $3L/8$, while the center section 38 is of a length $L/4$. FIGURES 4 and 5 may be proved to be "balanced" relative to the cross-slot flux in the same manner as was FIG. 3. The method of proof is the same and need not be repeated here.

It will be observed that, as a practical matter, the same strand shift as that shown in FIGS. 5a, 5b, wherein every strand moves nine places in the direction shown, could also be obtained by transposing the bar in the other direction, i.e., shifting strands upward in the near column and downward in the rear column, so that the strand shifted three places as illustrated in FIGS. 1a, 1b. FIGURE 5 is illustrated to point out that, although strand shift ratios from 0 to 1 are possible, in practical arrangements, by employing strand shift ratios of 0 to 0.5, and selecting the direction of transposition, the strands can be caused to shift to any desired position in the bar. In other words, strand $a$ can be placed at any desired position by simply choosing the proper strand shift ratio from 0 to 0.5 and choosing the direction of transposition. It will be observed that if this is done, the number of strand shifts S will be a fractional part of the number of strands in one stack of strands.

FIGS. 6 through 9, on the second page of the drawings, show the invention applied to conductor bars with odd total number of strands. The strand twisting is carried out according to the disclosure of the aforementioned U.S. Patent 2,249,509 to Welch, Jr. et al., and may provide additional advantages, since there are no vertically projecting crossovers as in FIG. 1, and there is more copper in the same cross-sectional space required.

Referring to FIG. 6, the armature bar shown generally at 40 has curved end turn sections, portions of which are seen as 41, 42, and a straight twisted-strand section 43, adapted to fit in the slot of a dynamoelectric machine. The strands are disposed in a near stack 44 and a far stack 45. The strands are designated $m$ through $u$, and it will be seen that there is an odd total number of strands, the near stack 44 having one extra strand.

Short pitch crossovers are designated as 46, and long pitch crossovers as 47. Each crossover is also designated by the letter of the strand making the crossover, as it was in FIG. 1 It will be observed that the strands do not continuously change their vertical positions as do those in FIG. 1, but that they alternately "move" and "dwell" as seen in the strand segments designated 48, 49, respectively.

It will also be observed that the strands are bent transversely to make the crossover when they are in the top and bottom positions. The top and bottom crossovers are not made at the same axial location as in FIG. 1, but alternately, i.e., a top strand is bent to the far stack, then a bottom strand is bent to the near stack, etc.

The lengths of the two end sections 50 and the length of the center section 51 are determined by the previously mentioned formulas. Reference to FIG. 7 of the drawing illustrates two typical strands $m$, $q$, shown as single lines. These lines may be divided into segments and it can be shown that each segment in one strand has its counterpart in a segment or segments of the other strand, as before.

FIGS. 6a, 6b illustrate the net shift of strands $m$. When determining the strand shift "S" in odd strand bars, the hole or "void" at the cross-section is not included. Therefore, strand shift $S=2$ and strand shift ratio $K=2/9$ or 0.22.

Referring to FIG. 8 of the drawing, an armature bar 52 has the same number of strands as armature bar 40, which are designated $m'$ through $u'$. The corresponding simplified diagram is shown in FIG. 9 where the end sections are indicated as 53 and the center section as 54.

FIGS. 8 and 9 represent a slightly different family of transpositions from that of FIGS. 6 through 7. The two families are caused by the presence of an odd number of strands, and the type of transposition employed. The characteristic feature is illustrated by the cross-sectional views, FIGS. 8a, 8b, wherein it will be seen that strand $m$ undergoes a strand shift of two positions (not counting the void), whereas strand $q$ undergoes a shift of three positions. In other words, approximately half of the strands shift one more place than the other half of the strands. This may be compensated for in the formulas by counting a movement of the void from top to the bottom of the bar, and vice versa, as equalling ½ of a strand shift. Hence, strand shift S is calculated as before, ignoring the void, for a strand making the least number of shifts. Then ½ is added to it. In other words, strand shift S for an odd strand bar is equal to the average net shift of the strands, since some shift more than others.

According to this definition, the strand shift of FIG. 9 must be determined using strand $m$, which shifts two places, and increasing it by one-half, i.e., $S=2.5$. The strand shift ratio then is 2.5/9 or .278. The lengths of the end sections are, therefore, $5L/36$ and the length of the center section is $13L/18$.

In carrying out the invention, the minimum possible length for the end sections employing short pitch crossovers is usually favored, so as to reduce the number of short pitch crossovers which tend to be more vulnerable to strand shorts. Hence, the preferred values for K will lie between but excluding 0 to 0.5, or in other words, the number of strand shifts S will be less than the number of strands in one of the two stacks of strands, i.e., a fractional part thereof. By choosing the direction of rotation, any desired strand shift can be obtained to accommodate group transpositions along the phase belt or to compensate for unsymmetrical conditions on opposite ends of the generator.

The aforedescribed armature bar transposition arrangement provides cancellation of voltages due to cross-slot flux for a wide variety of transpositions heretofore not thought possible. Rather than limiting the strand shift along the slots to symmetrical shifts, the designer may now select the strand shift required to achieve any desired asymmetrical arrangement. The unequal voltages induced by cross-slot flux will be balanced on any of these strand shifts provided the correct lengths are selected according to the formulas given.

The correct strand shift to be chosen will depend on a great many factors, changing with each design, and no particular arrangement can be singled out as optimum for all circumstances. The invention provides the designer with the means to select any desired strand shift.

Other modifications of the invention will occur to those skilled in the art. It is, of course, intended to cover in the appended claims all such modifications as fall within the true spirit and scope of the invention.

What I claim as new and desire to secure by Letters Patent of the United States is:

1. A transposed multi-strand conductor bar having a straight slot portion with connecting end portions, said conductor comprising a plurality of conductor strands arranged in two stacks, each one of said strands being transposed through said stacks along the straight portion of the conductor to occupy the same relative positions in said stacks for substantially the same increments of conductor length as any other one of said strands, and to occupy asymmetrically disposed positions at opposite ends of the straight portion.

2. A transposed multi-strand conductor bar having a straight slot portion with connecting integral end portions, said conductor comprising a plurality of conductor strands arranged in two stacks, each one of said strands being transposed along the straight slot portion of the conductor to occupy the same relative positions in said stacks for substantially the same increments of conductor length as any other one of said strands, and to undergo a shift of relative strand positions at opposite ends of the straight portion which is less than the number of strand positions in one of said stacks.

3. A transposed multi-strand conductor bar having a straight slot portion of length L and connecting end portions joining said straight portion, said conductor comprising a plurality of conductor strands arranged in two stacks, each of said strands being transposed along the straight slot portion to occupy asymmetrically disposed relative positions at opposite ends of the straight portion, said straight portion being divided into a central section and two end sections, the rate of transposition of the strands in said end sections being substantially twice that of the strands in the central section, the length of the end sections each being substantially $$\frac{LK}{2}$$

and the length of the center section being $L(1-K)$, where K equals the number of relative strand positions shifted divided by the total number of conductor strands.

4. A transposed multistrand conductor bar having a straight portion of length L with curved end portions joining said straight portion, said conductor comprising a plurality of conductor strands disposed in two stacks, said strands being transposed along the straight portion to occupy asymmetrically disposed relative strand positions at opposite ends of the straight portion, said straight portion being divided into a central section of length $L(1-K)$ and two end sections each of a length $$\frac{LK}{2}$$

where K lies between but not including 0 and 0.5, the average slope of the strands in the end sections being substantially twice that of the strand slope in the central section.

5. A transposed multistrand conductor bar having a straight portion of length L with curved end portions joining said straight portion, said conductor comprising a plurality of conductor strands arranged in two stacks, said straight portion being divided into a central section of length $L(1-K)$ and two end sections each of a length $$\frac{LK}{2}$$

where K lies between but not including 0 and 0.5, said strands being transposed along the straight portion so that the rate of transposition in the end sections is substantially twice that in the central section.

6. A transposed multistrand conductor bar having a straight twisted-strand portion of length L and curved end portions, said conductor comprising first and second stacks of conductor strands, each of said stacks having the same number of strands, said straight portion being divided into a central section of a length $L(1-K)$ and two end sections each of a length $$\frac{LK}{2}$$

where K equals the number of relative positions shifted by a strand as observed at opposite ends of the straight portion divided by the total number of conductor strands, K lying between but not including 0 and 0.5, said strands being transposed by rotation with simultaneous crossovers at top and bottom of the conductor in a manner such that the slope of the strands in the end sections is substantially twice the slope of the strands in the central section.

7. A transposed multistrand conductor bar having a straight twisted strand portion of length L and curved end portions, said conductor comprising first and second stacks of conductor strands, the first stack having one more strand than the second stack, whereby a void position appears at the top or bottom of the conductor, said straight portion being divided into a central section of length $L(1-K)$ and two end sections each of a length $$\frac{LK}{2}$$

where K equals the average number of relative strand positions shifted (excluding said void position) as observed at opposite ends of the straight portion divided by the total number of conductor strands, K lying between but excluding 0 and 0.5, said strands being transposed with crossovers at top and bottom of the conductor alternately, whereby the strands in one stack remain at the same relative slot position while the strands in the other stack are shifting relative positions, the shifting of the stacks taking place in the end sections with twice the frequency as in the central section.

No references cited.